(12) United States Patent
Chang

(10) Patent No.: US 8,742,722 B2
(45) Date of Patent: Jun. 3, 2014

(54) DYNAMIC POWER MANAGEMENT SYSTEM AND METHOD

(75) Inventor: Charles Chang, Coto De Caza, CA (US)

(73) Assignee: International Rectifier Corporation, El Segundo, CA (US)

( * ) Notice: Subject to any disclaimer, the term of this patent is extended or adjusted under 35 U.S.C. 154(b) by 738 days.

(21) Appl. No.: 12/807,081

(22) Filed: Aug. 27, 2010

(65) Prior Publication Data

US 2012/0049801 A1    Mar. 1, 2012

(51) Int. Cl.
*H02J 7/00* (2006.01)
(52) U.S. Cl.
USPC .............. 320/119; 320/118; 320/132; 307/82
(58) Field of Classification Search
USPC .............................. 320/118, 130, 132; 307/82
See application file for complete search history.

(56) References Cited

U.S. PATENT DOCUMENTS

| | | | |
|---|---|---|---|
| 6,243,277 B1 * | 6/2001 | Sun et al. | 363/65 |
| 6,608,396 B2 | 8/2003 | Downer | |
| 6,628,011 B2 | 9/2003 | Droppo | |
| 7,245,108 B2 | 7/2007 | Chertok | |
| 7,282,814 B2 * | 10/2007 | Jacobs | 307/82 |
| 7,400,113 B2 | 7/2008 | Osborne | |
| 7,489,106 B1 | 2/2009 | Tikhonov | |
| 8,531,160 B2 * | 9/2013 | Moorhead et al. | 320/136 |
| 2004/0135546 A1 * | 7/2004 | Chertok et al. | 320/118 |
| 2004/0257042 A1 * | 12/2004 | Liu et al. | 320/130 |

FOREIGN PATENT DOCUMENTS

WO    WO 00/21178    4/2000

* cited by examiner

*Primary Examiner* — Edward Tso
*Assistant Examiner* — Ramy Ramadan
(74) *Attorney, Agent, or Firm* — Farjami & Farjami LLP

(57) ABSTRACT

According to one embodiment, a system configured to provide dynamic power management for a plurality of energy cells comprises an array of energy cells for providing a primary current path to a load, and a respective power stage for each energy cell. The power stages are configured to transfer power to and from each respective energy cell. The system further comprises a temporary energy storage node enabling energy transfer from a first plurality of energy cells comprised by the array of energy cells to a second plurality of energy cells comprised by the array of energy cells. In one embodiment, the system further comprises a feedback system for maintaining the temporary energy storage node at a constant average power.

29 Claims, 5 Drawing Sheets

Fig. 5

Battery Discharge Example

Node 424a:  -15A * 1BV =  - 15BVA
Node 424b: +25A * 2BV =  + 50BVA
Node 424c:  -30A * 3BV =  - 90BVA
Node 424d: +10A * 4BV =  + 40BVA
Node 424e: +15A * 5BV =  + 75BVA
Node 424f :  -10A * 6BV =  - 60BVA $$\Sigma E_{Cells\ 1\text{-}6} = 0$$

Note: BV ≡ battery voltage of the cells

DYNAMIC POWER MANAGEMENT SYSTEM AND METHOD

BACKGROUND OF THE INVENTION

1. Field of the Invention

The present invention is generally in the field of electrical circuits and systems. More specifically, the present invention is in the field of power management circuits and systems.

2. Background Art

The storage and on-demand delivery of electrical energy is becoming of increasing importance as the shift from fossil fuel based technologies to green technologies gains momentum. Gas/electric hybrid automobiles, for example, typically utilize arrays of secondary batteries that are alternately charged and discharged in response to vehicular operation. Those secondary battery packs may constitute a substantial portion of the cost of a gas/electric hybrid vehicle, and their performance, and in particular their longevity, may significantly influence consumer willingness to invest in the initially costlier vehicle purchase price.

Typical energy storage packs are assembled from individual batteries or energy cells and each unit is often assumed or selected to be nominally identical. In practice, the batteries or other energy cells will have individual performance parameters, such as storage capacity and/or resistance, that vary somewhat from unit to unit. The distribution or variation among cells may arise, for example, from process variation at the time of manufacturing, from unequal wear during use cycles, and other non-use related degradation of the energy cells. In general, the distribution of the variations is often seen to grow wider as the energy cells grow older. Unfortunately, moreover, the longevity and capacity of a group of energy cells used collectively, such as a battery pack, is typically determined by the weakest cell or battery in the group.

When a collection of cells is used in the discharge process, the first cell that reaches the full discharge point (e.g., the weakest cell) stops the discharge process despite the strong cells perhaps having remaining charge that is unused. When such a collection of cells is charged, the first cell that reaches the full charge point (e.g., the weakest cell) stops the process while the stronger cells remain undercharged. Over repeated cycles, the balance among cells may become worse. Furthermore, the capacity of the cell will degrade with each cycle, and, depending on the depth of discharge, the cells will typically age at different rates when discharged at different depth of charge. This implies that the weakest cell will typically experience the greatest depth of discharge which will age the cell faster making it a still weaker cell.

Conventional approaches to providing management of battery performance tend to focus on balancing one aspect of the cells at a given fixed time (usually when the pack is not in use). At that one point in time, the stronger cells are bled down to the level set by the weakest cell. For example, after a charge cycle, all of the voltages for each cell are different, representing a variation in state of charge. In other active implementations, charge is transferred from one cell to another (e.g., either to adjacent cells or on a random basis) until the voltage is balanced. The battery management system (BMS) bleeds charge until the all cells achieve the same voltage as the weakest cell. During normal operation (e.g., discharge and/or charge), the cells are typically discharged and/or charged at the same current. Because the charge capacity typically varies from cell to cell, the energy of each cells is drawn down or charged up at a different rate and the end of each cycle is limited by the weakest cell.

Thus, there is a need to overcome the drawbacks and deficiencies in the art by providing a power management solution capable of maintaining charge balance during dynamic operation which allows cells to have improved performance and increases the longevity of an energy cell array as a whole.

SUMMARY OF THE INVENTION

A dynamic power management system and method, substantially as shown in and/or described in connection with at least one of the figures, as set forth more completely in the claims.

BRIEF DESCRIPTION OF THE DRAWINGS

FIG. 5 is a table summarizing the inputs to and outputs from a bi-directional buck/boost array during the dynamically managed battery discharge example shown in FIG. 4.

DETAILED DESCRIPTION OF THE INVENTION

Figure 1:
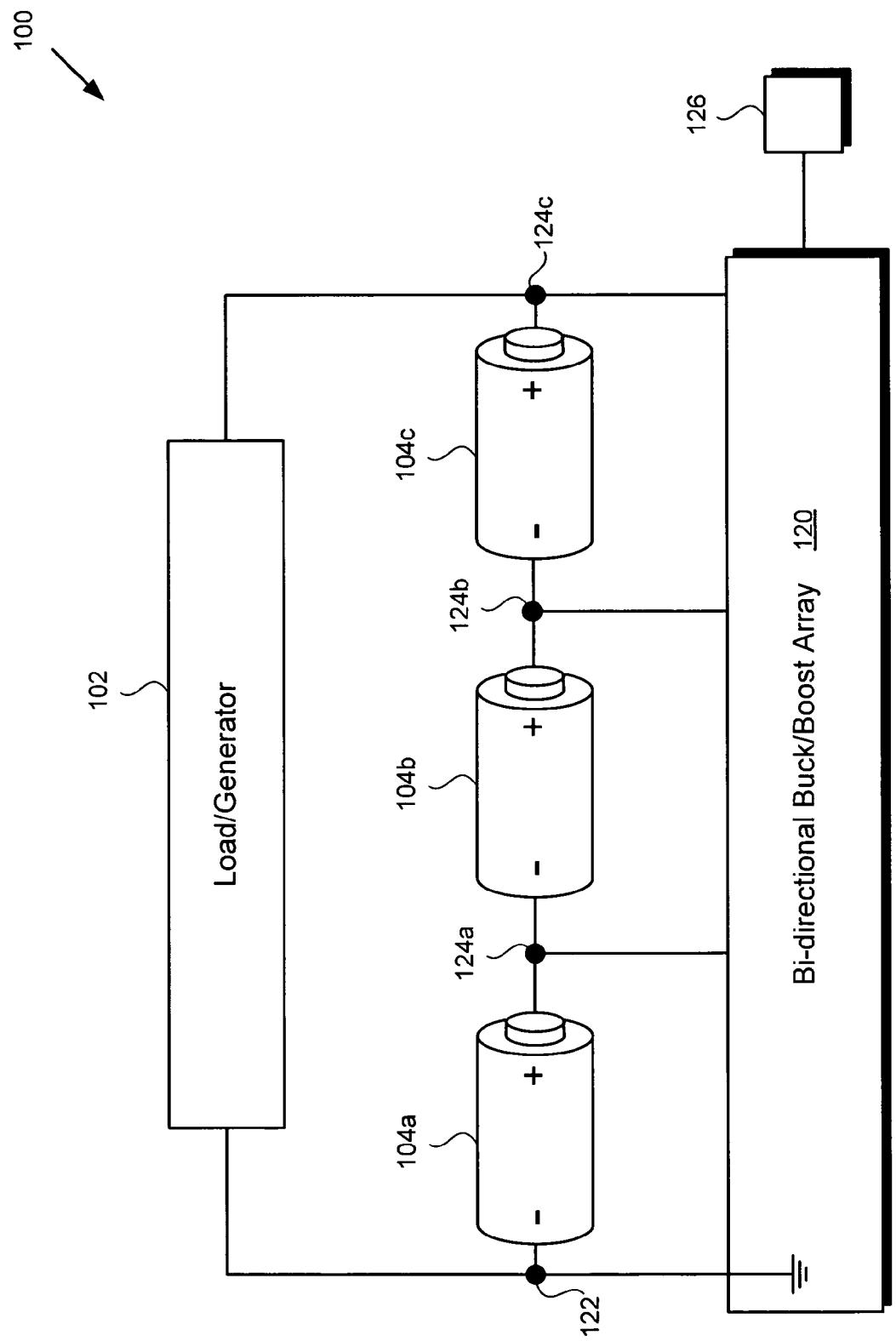
FIG. 1 is a block diagram showing selected features of a dynamic power management system including a bi-directional buck/boost array, according to one embodiment of the present invention.

The present invention is directed to a dynamic power management system and method. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 is a block diagram showing selected features of dynamic power management system 100 including bi-directional buck/boost array 120 in combination with temporary energy storage node 126, according to one embodiment of the present invention. As shown in FIG. 1, dynamic power management system 100 comprises bi-directional buck/boost array 120 including ground node 122 and input/output (IO) nodes 124a, 124b, and 124c (hereinafter IO nodes 124a-124c). In addition, system 100 includes energy cells 104a, 104b, and 104c (hereinafter energy cells 104a-104c), represented as batteries in FIG. 1. As indicated in FIG. 1, according to the present embodiment, energy cell 104a is connected between ground node 122 and IO node 124a, energy cell 104b is connected between IO nodes 124a and 124b, and energy cell 104c is connected between IO nodes 124b and 124c. Also shown in FIG. 1 is load/generator 102, which may comprise a load drawing current from energy cells 104a-104c during an energy discharge/charge process. Alternatively, load/generator 102 can operate as a charging source for energy cells 104a-104c during an energy accumulation process by energy cells 104a-104c, for example.

By way of perspective, in one embodiment, dynamic power management system 100 may be implemented using nominally identical secondary batteries as energy cells 104a-104c. For example, each of energy cells 104a-104c may comprise rechargeable (i.e., secondary) approximately 4 volt lithium-ion batteries, or lower voltage rechargeable nickel-metal hydride batteries. Bi-directional buck/boost array 120 can be configured to provide individualized dynamic power management for energy cells 104a-104c during charging of energy cells 104a-104c by generator 102, or during discharge or even heavy discharge of energy cells 104a-104c through load 102. In other words, in one embodiment, bi-directional buck/boost array 120 allows each of energy cells 104a-104c to have an individual discharge or charge current that is different from the average load current. This individual current can be selected to achieve and maintain balance of a particular cell during all aspects of cell operation (e.g., charge, discharge, and storage).

It is noted that although the various specific embodiments presented herein will represent energy cells such as energy cells 104a-104c as secondary batteries, for the purposes of illustrating the present inventive concepts, that characterization should not be interpreted as limiting. For instance, system 100 may include more, or fewer, energy cells than the three energy cells shown in FIG. 1. Moreover, although energy cells 104a-104c are characterized as secondary batteries capable of being charged as well as discharged, in one embodiment, energy cells 104a-104c may comprise primary batteries and bi-directional buck/boost array 120 may be implemented to dynamically manage power during battery discharge only. Furthermore, in other embodiments, energy cells 104a-104c can comprise any suitable charge storage devices, such as a rechargeable automotive batteries, super-capacitors, or photovoltaic cells or panels, for example.

Moreover, and more generally, the feature "energy cell," as used herein, may be characterized as one unit of the cells that supply current to a load, and thus can comprise a single cell, several cells connected in series and managed in common, several cells connected in parallel, or a combination of those arrangements. It is further noted that energy cells 104a-104c can be individual cells of the same nominal type or energy cells 104a-104c can be mixed cells of different cell technologies, wherein each is of a different nominal type.

The present inventor realizes that despite being nominally the same, each of energy cells 104a-104c has its own individual characteristics, such as charge capacity, which collectively form a variance distribution around the nominal values identified as characteristic of the group of energy cells including energy cells 104a-104c. By recognizing that those variances exist, and are in fact inevitable across any collection of energy cells, and by further configuring an energy management system to respond to and compensate for those variances in a dynamic way, embodiments of the present inventive concepts enable a collection of energy cells, such as energy cells 104a-104c to function more efficiently and more reliably.

In a traditional system, the discharge or charge current for each cell is the same; therefore, all cells charge and discharge at different rates and the useable range is limited by the weakest cell. However, through implementation of the dynamic power management approach disclosed by the present application, the disclosed bi-directional buck/boost array allows for individualized currents to supplement the "average" load current. The currents can be selected to achieve and maintain a balanced state of charge operation amongst the energy cells of the array. Under these conditions, during discharge, substantially all cells reach a maximum discharge point at substantially the same time. Likewise, during charge, substantially all cells reach the maximum charge point at substantially the same time.

Figure 2:
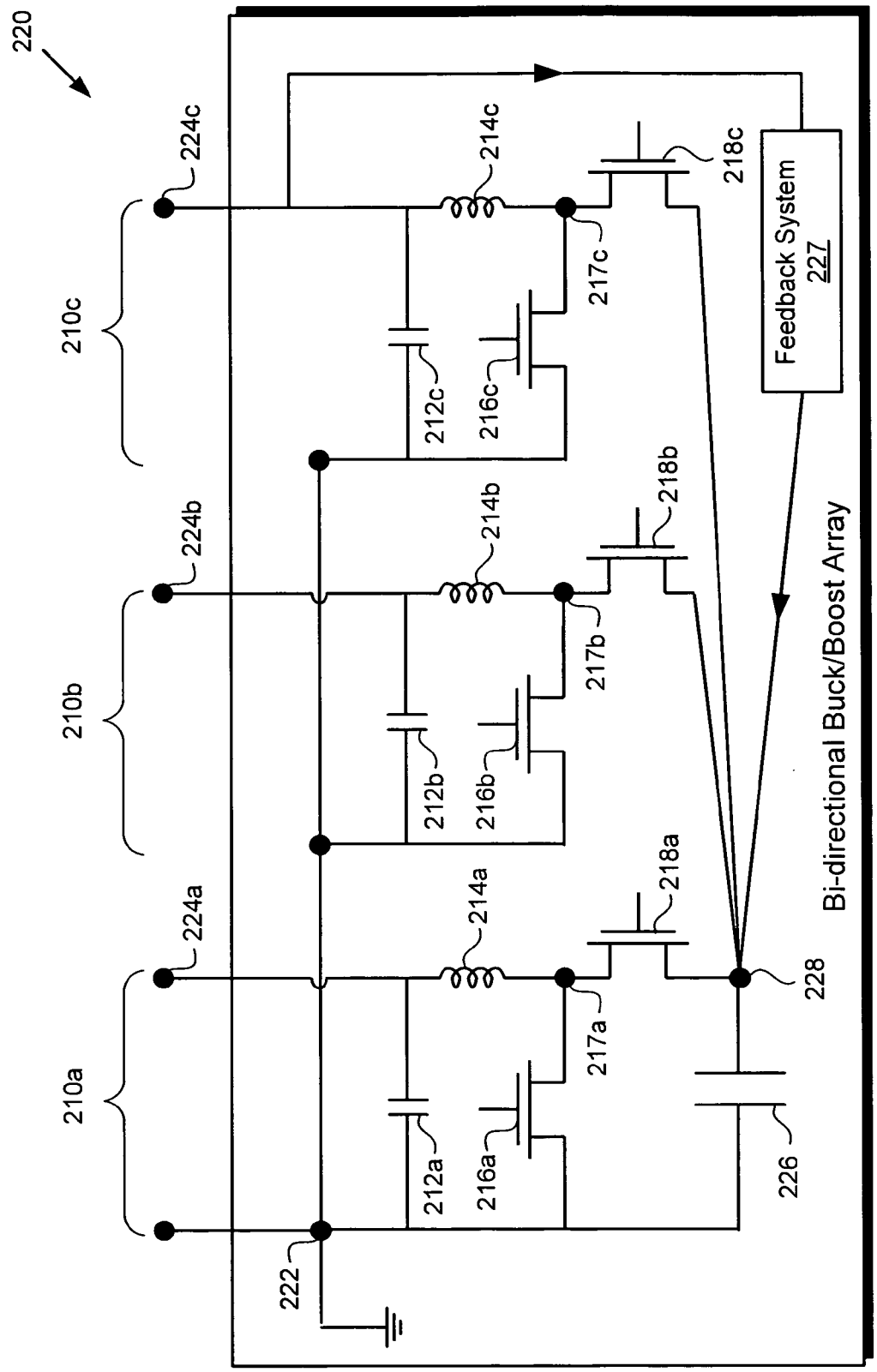
FIG. 2 is a conceptual diagram showing a more detailed representation of a bi-directional buck/boost array for use in a dynamic power management system, according to one embodiment of the present invention.

Turning to FIG. 2, FIG. 2 is a conceptual diagram showing a more detailed representation of bi-directional buck/boost array 220, according to one embodiment of the present invention. Bi-directional buck/boost array 220 having ground node 222 and IO nodes 224a, 224b, and 224c (hereinafter IO nodes 224a-224c) corresponds to bi-directional buck/boost array 120 including ground node 122 and IO nodes 124a-124c, in FIG. 1. As shown in FIG. 2, each of IO nodes 224a-224c is associated with a corresponding bi-directional buck/boost block, e.g., respective bi-directional buck/boost blocks 210a, 210b, and 210c (hereinafter bi-directional buck/boost blocks 210a-210c).

As further shown in FIG. 2, bi-directional buck/boost array 220 may also comprise storage capacitor 226 coupled between reference node 228 of bi-directional buck/boost array 220 and ground node 222, and feedback system 227. Storage capacitor 226 serves as a temporary storage node for bi-directional buck/boost array 220, and in that capacity corresponds to temporary storage node 126, in FIG. 1. Feedback system 227 may be used to keep storage capacitor 226 at a desired operating voltage, or within a desired operating voltage range. For example, feedback system 227 can be configured to draw energy from the top of the energy storage stack, e.g., node 224c in the embodiment of FIG. 2, in order to compensate for system losses, such as power converter loss, mismatch in a balance algorithm used by the system comprising bi-directional buck/boost array 220 to manage power. It is noted that, when properly determined, the balance algorithm will result in substantially no net energy into or out of the node reference node 228, so that storage capacitor 226 may be seen to provide a temporary storage node.

Bi-directional buck/boost block 210a may include capacitor 212a, inductor 214a, low side switch 216a, and high side switch 218a. As shown in FIG. 2, low side switch 216a and high side switch 218a are arranged in a half bridge configuration having switching node 217a coupled to IO node 224a by inductor 214a. Similarly, each of bi-directional buck/boost blocks 210b and 210c may include respective capacitors 212b and 212c, inductors 214b and 214c, as well as low side switches 216b and 216c and high side switches 218b and 218c arranged in half bridge configurations having switching nodes 217b and 217c.

As may be seen from FIG. 2, corresponding terminals of low side switches 216a, 216b, and 216c, are directly connected to ground node 222, which in the embodiment of FIG. 2 is a common ground node for bi-directional buck/boost blocks 210a, 210b, and 210c, as well as for bi-directional buck/boost array 220. In addition, FIG. 2 shows that corresponding terminals of high side switches 218a, 218b, and 218c are directly connected to reference node 228. Moreover, storage capacitor 226, which may be pre-charged, for example, can be utilized as a de facto power supply for one or more of high side switches 218a, 218b, and 218c during operation of bi-directional buck/boost array 220.

Although FIG. 2 represents single bi-directional buck/boost array 220 including buck/boost blocks 210a, 210b, and 210c sharing ground node 222 as a common node, the present inventive principles extend to other and/or more complex configurations. For example, in one embodiment, bi-directional buck/boost array 220 may be adapted such that ground node 222 is not shared in common by buck/boost blocks 210a, 210b, and 210c. In addition, in some embodiments, buck/boost blocks 210a, 210b, and 210c may be connected parallel, while in other embodiments buck/boost blocks 210a, 210b, and 210c may be connected in series. Moreover, in some embodiments, a dynamic power management system according to the present inventive concepts may comprise a plurality of bi-directional buck/boost arrays 220, configured to connect in series, in parallel, or using a combination of series and parallel arrangements.

Figure 3:
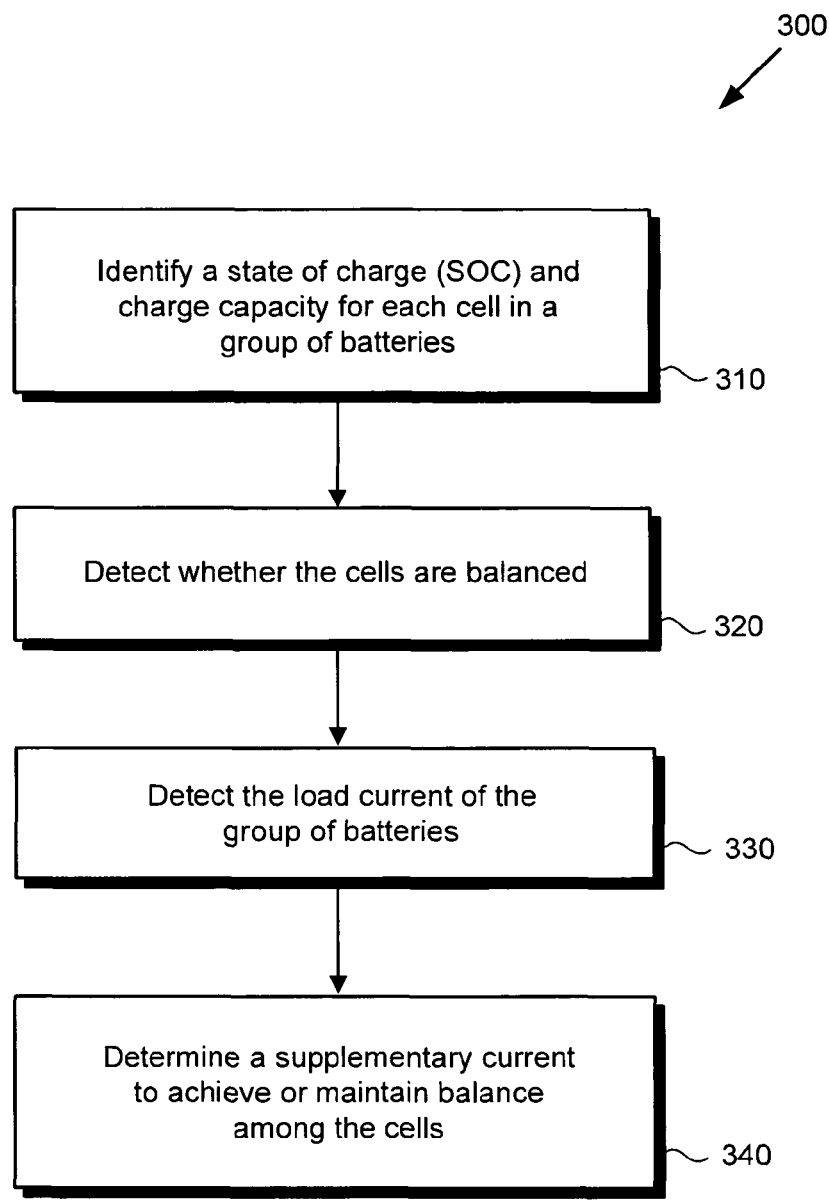
FIG. 3 shows a flowchart presenting a method for providing dynamic power management, according to one embodiment of the present invention.
Figure 4:
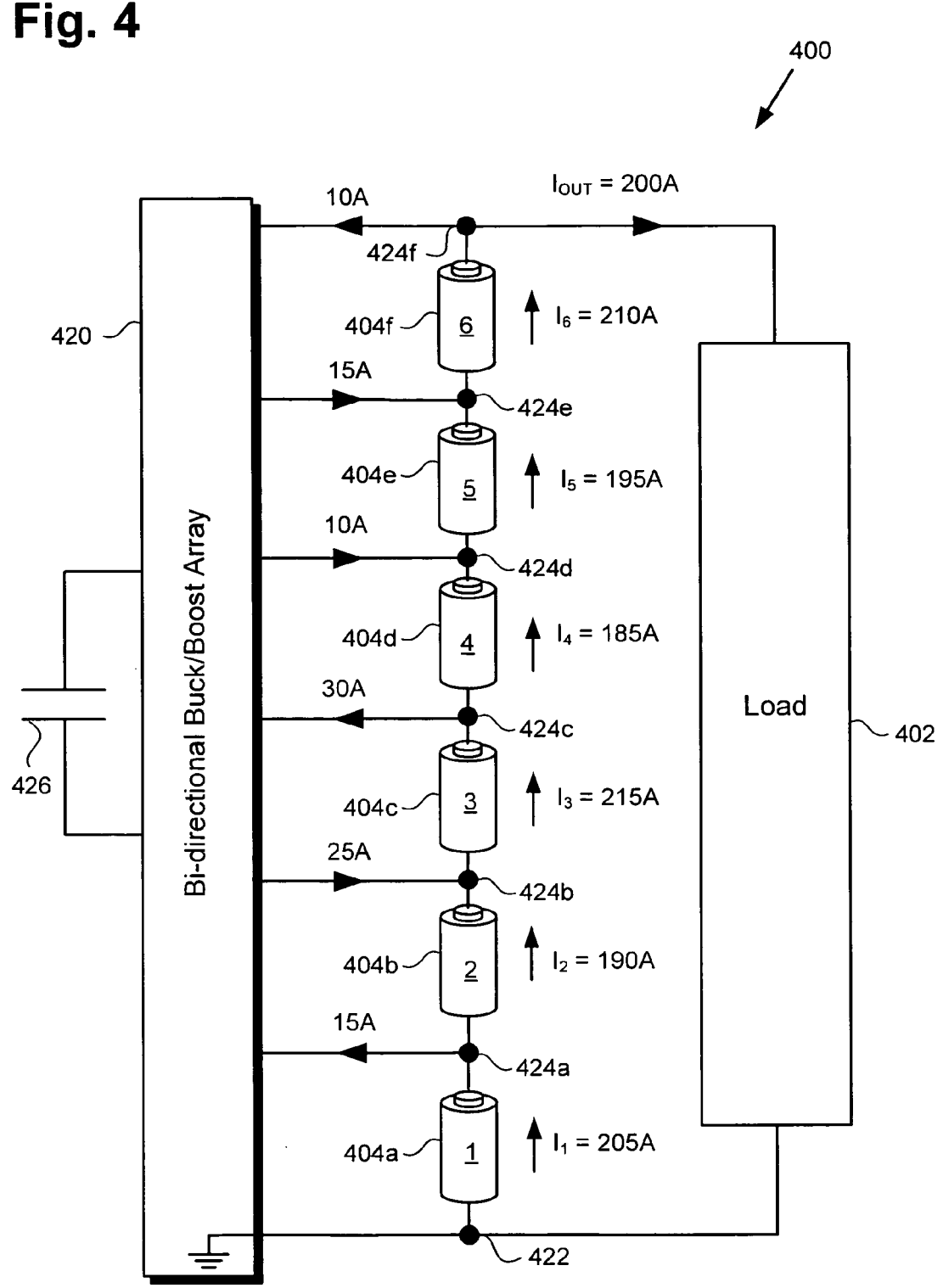
FIG. 4 shows an example of battery discharge by a dynamic power management system, according to one embodiment of the present invention.

The operation of dynamic power management system 100, in FIG. 1, and bi-directional buck/boost array 220, in FIG. 2, will now be further described in combination with FIGS. 3, 4, and 5. FIG. 3 shows a flowchart presenting a method for providing dynamic power management to two or more energy cells, such as batteries, during an energy discharge process, according to one embodiment of the present invention. FIG. 4 is a conceptual block diagram showing a specific example of dynamically managed battery discharge from a group of six batteries, according to one embodiment of the present invention, while FIG. 5 is a table summarizing the inputs from and outputs to bi-directional buck/boost array 420 during the dynamically managed battery discharge example shown in FIG. 4.

Referring to FIG. 4, FIG. 4 is a conceptual block diagram showing selected features of dynamic power management system 400 including bi-directional buck/boost array 420 and nominally identical batteries 404a, 404b, 404c, 404d, 404e, and 404f (hereinafter batteries 404a-404f) powering load 402. Dynamic power management system 400, in which batteries 404a-404f are discharged or charged through load 402, can be seen to correspond to dynamic power management system 100, in FIG. 1, during a discharge of energy cells 104a-104c through load 102 in that figure. According to the embodiment of FIG. 4, batteries 404a-404f are undergoing an energy discharge process, and may comprise secondary batteries, for example. More generally, batteries 404a-404f can be seen to correspond to any primary or secondary energy storage device, such as energy cells 104a-104c, in FIG. 1.

Bi-directional buck/boost array 420 including ground node 422 and IO nodes 424a, 424b, 424c, 424d, 424e, and 424f (hereinafter IO nodes 424a-424f) corresponds to bi-directional buck/boost array 120 including ground node 122 and IO nodes 124a-124c, in FIG. 1, as well as to bi-directional buck/boost array 220 including ground node 222 and IO nodes 224a-224c, in FIG. 2. In addition, storage capacitor 426 of bi-directional buck/boost array 420, in FIG. 4, corresponds to storage capacitor 226 of bi-directional buck/boost array 220, in FIG. 2.

Referring back to FIG. 3, FIG. 3 presents flowchart 300 describing one embodiment of a method for providing dynamic power management. Certain details and features have been left out of flowchart 300 that are apparent to a person of ordinary skill in the art. For example, a step may comprise one or more substeps or may involve specialized equipment or materials, as known in the art. While steps 310 through 340 indicated in flowchart 300 are sufficient to describe one embodiment of the present invention, other embodiments of the invention may utilize steps different from those shown in flowchart 300, or may comprise more, or fewer, steps.

Step 310 of flowchart 300 comprises identifying a state of charge (SOC) and charge capacity for each cell in a group of batteries. Referring to dynamic power management system 400, in FIG. 4, step 310 of flowchart 300 may be performed by bi-directional buck/boost array 420, for example, to identify the SOC and charge capacity of each of nominally identical batteries 404a-404f.

As previously explained, the present inventor realizes that fundamental variances across a collection of energy cells that are nominally the same will result in variances in their performance. For example, although the collection of nominally identical batteries 404a-404f can be characterized by average values for parameters such as charge capacity, each of batteries 404a-404f can be expected to have an individual charge capacity varying somewhat from the average. Over time, the capacity of a cell will change due to wear, and the rate of wear will vary from cell to cell due to individualized stress. Furthermore, depending on the use history, the SOC of each cell may not be uniform, such as, for example, after extended storage or after individual cell replacements. By measuring the cell voltage, current, temperature via monitor features within bi-directional buck/boost array 420 (monitoring features not shown in FIG. 4), it is possible to determine the present state of charge and capacity of batteries 404a-404f, which can change with time.

Continuing with step 320, in FIG. 3, step 320 of flowchart 300 comprises detecting whether batteries 404a-404f are balanced; that is to say, whether batteries 404a-404f have substantially the same SOC. Step 320, may be performed using bi-directional buck/boost array 420 from the determination performed in step 310. In the event that batteries 404a-404f are in balance, the subsequent steps of the present method are performed in order to maintain that balance. In the event that an imbalance among batteries 404a-404f is detected in step 320, however, the present method is designed to achieve balance, and then to maintain it.

Moving on to step 330 of FIG. 3, step 330 of flowchart 300 comprises detecting the load current of the group of batteries. For example, step 330 can comprise determining a discharge rate (or charge rate) for batteries 404a-404f, such as an average or instantaneous discharge/charge rate. According to the embodiment of FIG. 4, the discharge rate may be determined by measuring the output current $I_{OUT}$ flowing from dynamic power management system 400 to load 402. For example, step 330 may be performed using an inductive or current shunt (not shown in FIG. 4). It is noted that in the absence of the dynamic power management provided by bi-directional buck/boost array 420, all of batteries 404a-404f would share the same current despite the likely variances among their individual charge capacities and states of charge. However, by discharging, or charging, each of a collection of energy cells at a substantially uniform SOC for all of the energy cells, which is possible when the discharge/charge current for each energy cell is individualized, the solution disclosed by the inventor herein compensates for the almost inevitable differences among batteries 404a-404f.

Referring now to step 340 in FIG. 3, step 340 of flowchart 300 comprises determining the magnitude and direction of the currents inserted into nodes 424a-424f so as to maintain or achieve substantially constant SOC operation amongst batteries 404a-404f. For example, and assuming that the batteries are in a balanced state, individual variations in the charge capacities of batteries 404a-404f may result in the discharge rate for each being different when the batteries as a group are discharged at a substantially uniform SOC. Thus, in order to discharge at a substantially uniform SOC while producing a discharge rate of 200 A, the individual discharge rates for batteries 404a-404f may vary from as little as 185 A for battery 404d, to as much as 215 A for battery 404c. The individualized discharge rates are designed to supply the required load current while maintaining the state of charge balance. As shown in FIG. 4, in some embodiments, it may be the case that no individual battery will discharge at the average rate delivered to the load, e.g., 200 A. Step 320 may be performed by bi-directional buck/boost array 420, which can be configured to include circuitry for detecting the characteristic discharge rates for each of batteries 404a-404f such that the average discharge rate determined in step 310 is supported, and such that all of batteries 404a-404f are discharging at a substantially uniform SOC.

It is noted that the individualized cell discharge rates can be selected to achieve SOC balance or selected to achieve any other desired performance of the cells. For example, if replacement cells are included in the group of energy cells, they may be discharged at a higher rate and a deeper depth of discharge to gain a performance advantage while accelerating their wear until their respective operational states more closely match that of the group average. It is further noted that a similar approach can be used for the charge process as well.

In FIG. 4, Kirchoff's law is satisfied at all of IO nodes 424a-424f. The net effect of bi-directional buck/boost array 420 is to create a current that is in parallel with the battery. The sum of the parallel current and the cell current is equal to the average load current. This implies that the parallel current can flow in the same or opposite direction of the current flowing through each cell.

Focusing, for example, on IO node 424b, IO node 424b of bi-directional buck/boost array 420 serves as the output node of battery 404b, as well as comprising the input node to battery 404c. As shown by FIG. 4, the characteristic discharge rate for battery 404b is 190 A, while that of 404c is 215 A. It is noted that, in general, the magnitude of a particular node current may depend on the difference in requirements of the top and bottom cells in the array, while the sign determines whether current needs to be supplied into the node or drawn out of it.

Bi-directional buck/boost array 420 is configured to supplement the discharge rate at IO node 424b by supplying the difference between the characteristic discharge rates of adjoining batteries 404b and 404c directly connected to IO node 424b, e.g., by supplying 25 A, as shown in FIG. 4. Bi-directional buck/boost array can draw the current required to supplement the energy transfer rate at IO node 424b from storage capacitor 426, for example, which can be configured to serve as the source for the supplemental current flowing from bi-directional buck/boost array 420 at IO node 424b. Similarly, storage capacitor 426 can serve as the source for the supplemental currents flowing from bi-directional buck/boost array 420 at respective IO nodes 424d and 424e. Ideally, the balancing achieved by bi-directional buck/boost array 420 results in there being no net energy flow into our out of storage capacitor 426. This allows the simultaneous management of a first plurality of energy cells comprising "n" cells, for example, receiving supplemental current and a second plurality of energy cells comprising "m" cells, for example, from which current is being drawn, each energy cell characterized by a unique individualized current.

By contrast, the inflow of current from IO nodes 424a and 424c to bi-directional buck/boost array 420s serves as an example of reducing the discharge rate at the output of each battery when the next battery has a lower characteristic discharge rate. Referring, for example, to IO node 424a, IO node 424a of bi-directional buck/boost array 420 serves as the output node of battery 404a, as well as comprising the input node to battery 404b. As shown by FIG. 4, the characteristic discharge rate for battery 404a is 205 A, while that of 404b is 190 A.

Bi-directional buck/boost array 420 is configured to reduce the discharge rate at IO node 424a by diverting the difference between the characteristic discharge rates of adjoining batteries 404a and 404b directly connected to IO node 424a, e.g., by diverting 15 A in to bi-directional buck/boost array 420, as shown in FIG. 4. Bi-directional buck/boost array 420 can absorb the current required to reduce the energy transfer rate at IO node 424a by directing that current to storage capacitor 426, for example, which can be configured to serve as the sink for the reduction current flowing to bi-directional buck/boost array 420 at IO node 424a. Similarly, storage capacitor 426 can serve as the sink for the reduction currents flowing into bi-directional buck/boost array 420 at respective IO nodes 424c and 424f.

More generally, step 340 of flowchart 300 corresponds to adjusting the discharge rate at each IO node 424a-424f of bi-directional buck/boost array 420 by supplementing or reducing the energy discharge rate at those nodes such that discharge of each of batteries 404a-404f occurs at a substantially uniform SOC for all of the batteries. In other words, a method for providing dynamic power management for a group of batteries includes recognizing the capacity and the SOC of each battery, detecting whether the cells are balanced, e.g., have the same SOC, determining the load current, e.g., the average charge or discharge rate of each battery, determining a supplementary current that can increase or decrease the individual cell current from the average current, wherein the supplementary current is determined to maintain balance if it was present initially, or to achieve balance if it was not.

FIG. 5 is a table summarizing the inputs to and outputs from a bi-directional buck/boost array during the dynamically managed battery discharge example shown in FIG. 4. As previously explained, the dynamic power management approach disclosed herein enables discharge of batteries 404a-404f at a substantially uniform SOC, and calibrates the discharge rates for the individual batteries to meet the average discharge rate for the group, e.g., the load current $I_{out}$. Moreover, because the batteries 404a-404f are nominally identical, their individual performance variances from average values are statistically likely to be symmetrically distributed about those averages. Consequently, the present approach results in the sum of all energy supplements and energy reductions mediated by bi-directional buck/boost array 420 to substantially equal zero, or at least to approach that value.

That is to say, with the exception of internal losses due to operation of dynamic power management system 400, which may be expected to be small, energy is substantially conserved in the process of adjusting the discharge rates at each of IO nodes 424a-424f. As shown by table 500 in FIG. 5, the sum of the energy supplied to or sunk from each of IO nodes 424a-424f during discharge of batteries 404a-404f at a substantially uniform SOC sums to zero. Although the embodiments of FIGS. 3, 4, and 5 represent dynamic power management of batteries 404a-404f so as to result in their discharge at a substantially uniform SOC, the principles of the present invention can be applied to charge as well as discharge of rechargeable, e.g., secondary, energy cells of various types.

Although the embodiments of the present invention described herein have thus far focused on the power management approaches in which electrical energy is temporarily stored and utilized to balance a group of energy cells, the same inventive principles can by applied using other types of energy storage and employing different system topologies. For example, in one embodiment, a bi-directional power stage can be used to transfer magnetic energy into and out of a magnetic core. In that embodiment, energy could be transferred from a first plurality of energy storage units while energy was being dissipated to a second plurality of energy storage units, with a feedback system configured to maintain an average flux density inside of the magnetic core. In that case, the magnetic core functions as the temporary energy storage node, much like storage capacitor 426 provides that functionality in the embodiment of FIG. 4.

Thus, in a wide variety of possible implementations, embodiments of the present invention enable dynamic power management through the redistribution of energy among energy cells, during an energy discharge or an energy accumulation process, using a storage capacitor as an energy reservoir for that redistribution. Moreover, because energy is conserved in the dynamic power management approach disclosed herein, embodiments of the present invention enable energy transfer among a plurality of energy cells at a substantially uniform SOC without requiring additional energy inputs from one or more external power sources.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

The invention claimed is:

1. A dynamic power management system comprising:
   an array of energy cells for providing a primary current path to a load;
   a respective power stage for each energy cell, each respective power stage including a low side switch and a high side switch, said power stages configured to transfer power to and from each respective energy cell;
   a temporary energy storage node enabling energy transfer from a first plurality of energy cells comprised by said array of energy cells to a second plurality of energy cells comprised by said array of energy cells;
   said temporary energy storage node coupled to a corresponding terminal of each said high side switch.

2. The dynamic power management system of claim 1, wherein said power stages comprise power stages connected in parallel.

3. The dynamic power management system of claim 1, wherein said power stages comprise power stages connected in series.

4. The dynamic power management system of claim 1, further comprising a feedback system for maintaining said temporary energy storage node at a constant average power.

5. A dynamic power management system including a bi-directional buck/boost array, said bi-directional buck/boost array comprising:
   a first bi-directional buck/boost block including a first low side switch and a first high side switch arranged in a half bridge configuration;
   at least a second bi-directional buck/boost block including a second low side switch and a second high side switch arranged in a half bridge configuration;
   wherein a terminal of said first low side switch and a corresponding terminal of said second low side switch are directly connected to a common ground node;
   a storage capacitor coupled between a reference node of said bi-directional buck/boost array and said common ground node, said reference node coupled to a terminal of said first high side switch and a corresponding terminal of said second high side switch.

6. The dynamic power management system of claim 5, said reference node directly connecting said terminal of said first high side switch and said corresponding terminal of said second high side switch.

7. The dynamic power management system of claim 5, further comprising a feedback system for maintaining said storage capacitor within a desired operating voltage range.

8. The dynamic power management system of claim 5, wherein said storage capacitor is configured to serve as a power source for at least one of said first and second high side switches.

9. The dynamic power management system of claim 5, wherein said bi-directional buck/boost array is configured to provide power management for a first energy cell and at least a second energy cell.

10. The dynamic power management system of claim 9, wherein said first energy cell is coupled between an input/output (IO) node of said first bi-directional buck/boost block and said common ground node, and said second energy cell is coupled between an IO node of said second bi-directional buck/boost block and said IO node of said first bi-directional buck/boost block.

11. The dynamic power management system of claim 9, wherein said bi-directional buck/boost array is configured to provide power management for said first and second energy cells during energy discharge from said first and second energy cells and during energy accumulation by said first and second energy cells.

12. The dynamic power management system of claim 11, wherein said dynamic power management results in said energy discharge and said energy accumulation by said first and second energy cells occurring at a substantially uniform state of charge (SOC) for both of said first and second energy cells.

13. The dynamic power management system of claim 9, wherein said first and second energy cells comprise secondary batteries.

14. The dynamic power management system of claim 5, wherein said bi-directional buck/boost array is configured to provide power management for a group of energy cells by withdrawing energy from a first plurality of said group and supplying energy to a second plurality of said group substantially concurrently.

15. The dynamic power management system of claim 14, wherein said withdrawing energy and said supplying energy is performed to establish substantially the same SOC across all energy cells of said group.

16. The dynamic power management system of claim 14, wherein said dynamic power management system is further configured to allow for variation in the SOC across said group of energy cells during peak loads but achieves substantially the same SOC across all energy cells of said group before transition from charge to discharge or discharge to charge.

17. A dynamic power management system configured to provide dynamic power management for a plurality of energy cells, said system comprising:

a bi-directional buck/boost array including at least first and second bi-directional buck/boost blocks sharing a common ground node, said first bi-directional buck/boost block including a first low side switch and a first high side switch, said second bi-directional buck/boost block including a second low side switch and a second high side switch;

a first energy cell coupled between an input/output (IO) node of said first bi-directional buck/boost block and said common ground node;

a second energy cell coupled between an IO node of said second bi-directional buck/boost block and said IO node of said first bi-directional buck/boost block;

a temporary energy storage node coupled to a terminal of said first high side switch and a corresponding terminal of said second high side switch;

wherein said bi-directional buck/boost array is configured to provide dynamic power management for said first and second energy cells during energy discharge from said first and second energy cells and during energy accumulation by said first and second energy cells.

18. The dynamic power management system of claim 17, wherein said dynamic power management results in said energy discharge and said energy accumulation by said first and second energy cells occurring at a substantially uniform state of charge (SOC) for both of said first and second energy cells.

19. The dynamic power management system of claim 17, wherein said first and second energy cells comprise secondary batteries.

20. The dynamic power management system of claim 17, wherein:

said first bi-directional buck/boost block includes said first low side switch and said first high side switch arranged in a half bridge configuration;

said second bi-directional buck/boost block includes said second low side switch and said second high side switch arranged in a half bridge configuration; and wherein a terminal of said first low side switch and a corresponding terminal of said second low side switch are directly connected to said common ground node.

21. The dynamic power management system of claim 17, wherein said temporary energy storage node comprises a storage capacitor.

22. The dynamic power management system of claim 21, wherein said storage capacitor is configured to serve as a power source for said first and second high side switches.

23. A method for use by a system configured to provide dynamic power management for a plurality of energy cells, said method comprising:

determining an energy transfer rate for said plurality of energy cells;

detecting a characteristic energy transfer rate for each of said plurality of energy cells; and adjusting an output node energy transfer rate at a respective output node of each of said plurality of energy cells by supplementing or reducing said each output node energy transfer rate such that energy transfer for each of said plurality of energy cells occurs to optimize at least one performance target of said plurality of energy cells;

said adjusting performed using a respective plurality of bi-directional buck/boost blocks of said system;

each of said respective plurality of bi-directional buck/boost blocks including a low side switch and a high side switch, wherein a corresponding terminal of each said high side switch is coupled to a temporary energy storage node of said system.

24. The method of claim 23, wherein said at least one performance target comprises a substantially uniform state of charge (SOC) across all of said plurality of said plurality of energy cells.

25. The method of claim 23, wherein a sum of all energy supplements and energy reductions made to each said respective output node during said adjusting is substantially equal to zero.

26. The method of claim 23, wherein said adjusting of each output node energy transfer rate occurs during energy discharge from said plurality of energy cells and during energy accumulation by said plurality of energy cells.

27. The method of claim 23, wherein
a corresponding terminal of each said low side switch is directly connected to a common ground node.

28. The method of claim 23, wherein
said corresponding terminal of each said high side switch is directly connected to said temporary energy storage node.

29. The method of claim 23, wherein said plurality of energy cells comprises a plurality of secondary batteries.

* * * * *